United States Patent
Itou et al.

[11] Patent Number: 6,145,305
[45] Date of Patent: Nov. 14, 2000

[54] SYSTEM AND METHOD FOR DIAGNOSING DETERIORATION OF NOX-OCCLUDED CATALYST

[75] Inventors: Yasuyuki Itou; Kouji Ishihara, both of Yokohama, Japan

[73] Assignee: Nissan Motor Co., Ltd., Yokohama, Japan

[21] Appl. No.: 09/346,531

[22] Filed: Jul. 2, 1999

[30] Foreign Application Priority Data

Jul. 2, 1998 [JP] Japan .................................. 10-187145

[51] Int. Cl.$^7$ ...................................................... F01N 3/00
[52] U.S. Cl. .............................. 60/277; 60/274; 60/276; 60/285
[58] Field of Search .............................. 60/276, 277, 274, 60/285

[56] References Cited

U.S. PATENT DOCUMENTS

| | | | |
|---|---|---|---|
| 5,381,657 | 1/1995 | Takizawa et al. | 60/285 |
| 5,715,679 | 2/1998 | Asanuma et al. | 60/276 |
| 5,848,530 | 12/1998 | Matsuoka et al. | 60/277 |
| 5,953,907 | 9/1999 | Kato et al. | 60/274 |
| 5,979,161 | 11/1999 | Hanafusa et al. | 60/277 |

FOREIGN PATENT DOCUMENTS 2586739  12/1996  Japan .

*Primary Examiner*—Willis R. Wolfe
*Assistant Examiner*—Sneh Varma
*Attorney, Agent, or Firm*—Foley & Lardner

[57] ABSTRACT

A deterioration diagnosing system for a NOx-occluded catalyst comprises an inlet NOx concentration estimating unit which estimates NOx concentration at an inlet part of the catalyst; an outlet NOx concentration detecting unit which detects NOx concentration at an outlet part of the catalyst; and a deterioration degree judging unit which judges a deterioration degree of the catalyst in accordance with a rate of the minimum value of NOx concentration detected by the detecting unit for a predetermined period to a value of NOx concentration estimated by the estimating unit at the time when the minimum value of NOx concentration is detected. The predetermined period is a period between a time when the engine exhaust gas shows the stoichiometric and/or richer air/fuel ratio and a subsequent time when the engine exhaust gas shows the stoichiometric and/or richer air/fuel ratio.

9 Claims, 7 Drawing Sheets

SYSTEM AND METHOD FOR DIAGNOSING DETERIORATION OF NOX-OCCLUDED CATALYST

BACKGROUND OF THE INVENTION

1. Field of the Invention

The present invention relates to a system and a method for diagnosing deterioration of a catalyst installed in the exhaust stream of an internal combustion engine, and more particularly to a system and a method for diagnosing deterioration of a NOx-occluded type catalyst in the exhaust stream.

2. Description of the Prior Art

As is known, the NOx-occluded type catalyst has such a performance that when the exhaust gas from the engine shows a higher air/fuel ratio (viz., leaner), the catalyst occludes NOx in the exhaust gas, while when the exhaust gas shows a stoichiometric and/or lower air/fuel ratio (viz., richer), the catalyst releases NOx therefrom allowing reduction (or deoxidation) of NOx in the exhaust gas with the aid of HC and CO.

One of the systems for diagnosing deterioration of such NOx-occluded type catalyst is shown in Japanese Patent 2586739. In this system, under operation of the engine, the amount of NOx occluded by the NOx-occluded type catalyst is estimated and when the estimated amount of NOx exceeds a predetermined amount, the concentration of NOx at a position downstream of the catalyst is detected to carry out the deterioration diagnosis of the catalyst. That is, in the system, judgement as to deterioration of the catalyst is effected by checking the overflowed amount of NOx from the catalyst with reference to a predetermined value.

For ease of description, in the following, the NOx-occluded type catalyst will be referred to as NOx-occluded catalyst, and an air/fuel ratio higher or lower than a stoichiometric air/fuel ratio (viz., 14.6/1) will be referred to a leaner or richer air/fuel ratio.

SUMMARY OF THE INVENTION

It is an object of the present invention to provide a system and a method which can accurately diagnose deterioration of the NOx-occluded catalyst by practically employing a unique deterioration judging measure.

According to the present invention, a unique measure is practically employed wherein when NOx concentration at an outlet of the catalyst shows the minimum value, the NOx-occluded catalyst has substantially no NOx occluded therein and thus the catalyst can exhibit the highest NOx occluding performance.

According to a first aspect of the present invention, there is provided a system for diagnosing deterioration of a NOx-occluded catalyst installed in an exhaust stream of an internal combustion engine. The catalyst occludes NOx in the exhaust gas when the engine exhaust gas led to the catalyst shows a leaner air/fuel ratio and releases NOx therefrom when the engine exhaust gas shows a stoichiometric and/or richer air/fuel ratio. The deterioration diagnosing system comprises an inlet NOx concentration estimating unit which estimates NOx concentration at an inlet part of the catalyst; an outlet NOx concentration detecting unit which detects NOx concentration at an outlet part of the catalyst; and a deterioration degree judging unit which judges a deterioration degree of the catalyst in accordance with a rate of the minimum value of NOx concentration detected by the detecting unit for a predetermined period to a value of NOx concentration estimated by the estimating unit at the time when the minimum value of NOx concentration is detected. The predetermined period is a period between a time when the engine exhaust gas shows the stoichiometric and/or richer air/fuel ratio and a subsequent time when the engine exhaust gas shows the stoichiometric and/or richer air/fuel ratio.

According to a second aspect of the present invention, there is provided a method of diagnosing deterioration of a NOx-occluded catalyst installed in an exhaust stream of an internal combustion engine. The catalyst occludes NOx in the exhaust gas when the engine exhaust gas led to the catalyst shows a leaner air/fuel ratio and releases NOx therefrom when the engine exhaust gas shows a stoichiometric and/or richer air/fuel ratio. The method comprises estimating NOx concentration at an inlet part of the catalyst; detecting NOx concentration at an outlet part of the catalyst; deriving a rate of the minimum value of the NOx concentration detected for a predetermined period to a value of NOx concentration estimated at the time when the minimum value is detected, the predetermined period being a period between a time when the engine exhaust gas shows the stoichiometric and/or richer air/fuel ratio and a subsequent time when the engine exhaust gas shows the stoichiometric and/or richer air/fuel ratio; and judging a deterioration degree of the catalyst in accordance with the derived rate.

According to a third aspect of the present invention, there is provided a system for diagnosing deterioration of a NOx-occluded catalyst installed in an exhaust stream of an internal combustion engine. The catalyst occludes NOx in the exhaust gas when the engine exhaust gas led to the catalyst shows a leaner air/fuel ratio and releases NOx therefrom when the engine exhaust gas shows a stoichiometric and/or richer air/fuel ratio. The deterioration diagnosing system comprises first means for estimating NOx concentration at an inlet part of the catalyst; second means for detecting NOx concentration at an outlet part of the catalyst; and third means for judging a deterioration degree of the catalyst in accordance with a rate of the minimum value of NOx concentration detected by the second means for a predetermined period to a value of NOx concentration estimated by the first means at the time when the minimum value of NOx concentration is detected. The predetermined period is a period between a time when the engine exhaust gas shows the stoichiometric and/or richer air/fuel ratio and a subsequent time when the engine exhaust gas shows the stoichiometric and/or richer air/fuel ratio.

DETAILED DESCRIPTION OF THE EMBODIMENTS

Before describing the detail of the embodiments, the concept of the present invention for diagnosing deterioration of a NOx-occluded catalyst will be described with reference to some of the drawings.

Figure 6:
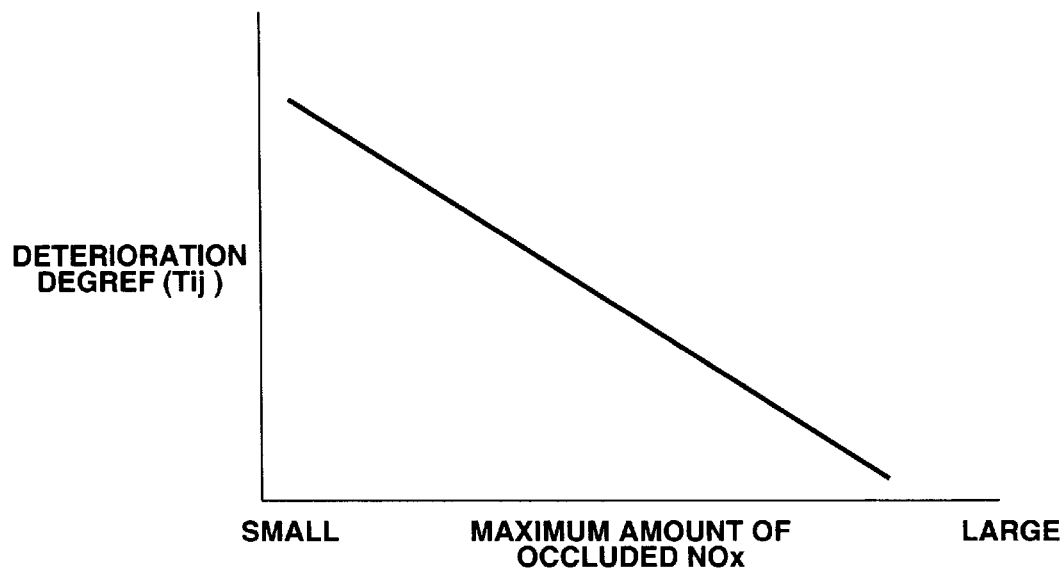
FIG. 6 is a graph showing a NOx occlusion tendency possessed by a NOx-occluded catalyst.

In general, an allowable NOx occluding capacity of a NOx-occluded catalyst (viz., the maximum amount of NOx occluded by the catalyst) is affected mainly by heat applied to the catalyst and poisoning by sulfur in the fuel. FIG. 6 shows a NOx occlusion tendency of a NOx-occluded catalyst in terms of the relationship between the maximum amount of NOx occluded by the catalyst and a deterioration degree "Tij" of the catalyst.

The NOx-occlusion ability of the catalyst (viz., the amount of NOx which can be occluded by the catalyst per unit time) depends on the above-mentioned allowable NOx occluding capacity. Accordingly, by detecting the NOx-occlusion ability at a certain time, the deterioration degree of the catalyst can be estimated or diagnosed. If, in this case, the rate of NOx concentration at an outlet of the catalyst to that at an inlet of the catalyst is known, the NOx-occlusion ability of the catalyst is derived and thus the allowable NOx occluding capacity is also derived, which makes it possible to diagnose the deterioration degree of the catalyst. The present invention is provided by embodying this concept.

As is described hereinabove, the NOx-occlusion ability of the catalyst depends on the allowable NOx occluding capacity. Beside this, the NOx-occlusion ability changes in accordance with the amount of NOx which has been actually occluded by the catalyst, that is, in accordance with a NOx-occlusion history. Accordingly, if such NOx-occlusion history is accurately grasped at a certain time, the deterioration degree of the catalyst would be accurately diagnosed based on the NOx-occlusion ability at such time. However, in practice, grasping the NOx-occlusion history is very difficult.

Accordingly, in the present invention, the following measure is practically adopted.

That is, in order to avoid the undesired effect by the NOx-occlusion history, the catalyst deterioration diagnosis is carried out at the time when, after completion of NOx releasement by a rich spike, the NOx concentration at the outlet of the NOx-occluded catalyst shows the minimum value (viz., peak value). As is known, the rich spike is a feedback control wherein when the amount of NOx occluded by the catalyst is detected to come up to the allowable NOx occluding capacity, the target air/fuel ratio of a mixture fed to the engine is temporarily changed to a lower side (viz., richer side) to force the catalyst to release NOx therefrom.

In general, the NOx-occlusion performance of the catalyst shows the highest at the NOx-occlusion starting time when the catalyst has substantially no NOx occluded therein. At such starting time, the rate of NOx concentration at the outlet of the catalyst to that at the inlet of the catalyst precisely reflects a deterioration degree of the catalyst, which brings about improvement in accuracy of the deterioration diagnosis.

In order to detect the peak value (viz., minimum value) of NOx concentration at the outlet of the catalyst, it is preferable to adopt the following technique. That is, when the detected NOx concentration shows an up-gradient tendency curve just after showing a down-gradient tendency curve, the inflection point between the two tendency curves is used as the peak value.

Furthermore, it is preferable to carry out the catalyst deterioration diagnosis after the engine has come to a lean combustion operation. That is, when the engine is under a rich combustion operation, NOx is cleaned up by the catalyst and thus, the amount of discharged NOx can not be accurately detected.

That is, the catalyst deterioration diagnosis according to the present invention is carried out when the engine has come to a lean combustion operation to cause the NOx occluded catalyst to occlude NOx.

For judging the time when the peak value of NOx concentration at the outlet of the catalyst appears, the following measure is preferable. That is, the output from a NOx sensor installed at the outlet of the catalyst is monitored for a given time, the minimum one of the monitored NOx concentration data is memorized and the judgment is made based on the memorized minimum NOx concentration.

In the following, embodiments of the present invention will be described in detail with reference to the drawings.

Figure 1:
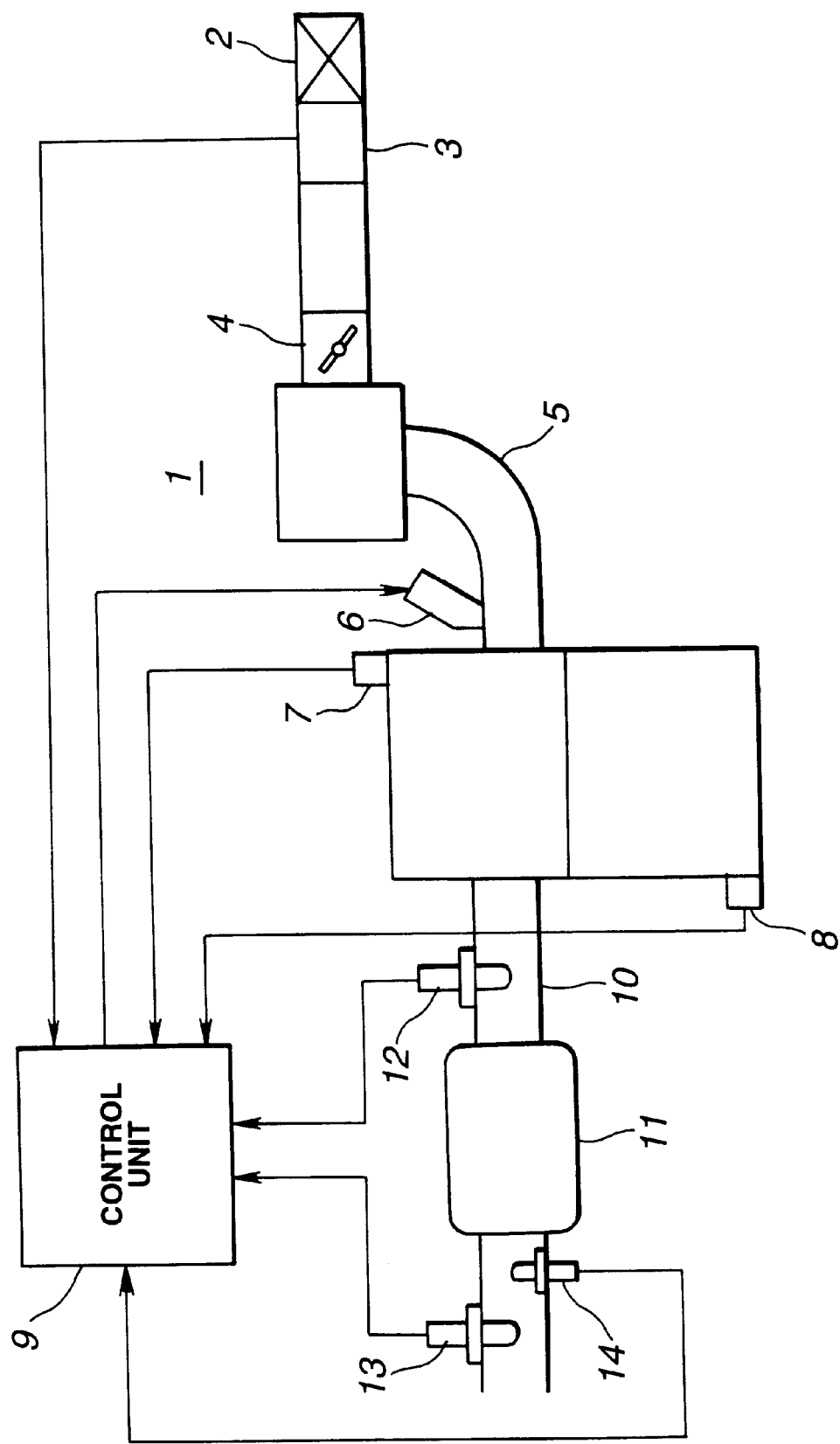
FIG. 1 is a schematic view of an internal combustion engine to which the present invention is practically applied.

Referring to FIG. 1, there is schematically shown an internal combustion engine 1 to which a catalyst deterioration diagnosing system of the present invention is practically applied.

An intake system of the engine 1 comprises generally an air cleaner 2 for cleaning air directed toward combustion chambers of the engine, an air flow meter 3 for measuring a flow rate of the intake air, a throttle chamber 4 for metering the air practically fed the combustion chambers, an intake manifold 5 for introducing the metered air to each of the combustion chambers and fuel injectors 6 for feeding metered fuel to respective branches of the intake manifold 5.

A temperature sensor 7 and a crank-angle sensor 8 are mounted to the engine 1, which detect the temperature of engine cooling water and engine speed respectively. Outputs from the temperature sensor 7, the crank-angle sensor 8 and the above-mentioned air flow meter 3 are fed to a control unit 9.

In the control unit 9, a basic fuel injection rate for lean or stoichiometric engine operation is calculated based on both the air flow rate measured by the air flow meter 3 and the engine speed measured by the crank-angle sensor 8, and the basic fuel injection rate is corrected or added with a fuel increase value derived based on the cooling water temperature measured by the temperature sensor 7 thereby to determine a target fuel injection rate. Upon receiving instruction signals representing the target fuel injection rate, the fuel injectors 6 inject corresponding amount of fuel to the respective branches of the intake manifold 5.

It is to be noted that the engine 1 may be of a so-called "direct gasoline injection" type wherein fuel is directly injected into each combustion chamber. In this case, the fuel injectors 6 are arranged having their fuel injection nozzles exposed to the respective combustion chambers.

An exhaust system of the engine 1 comprises generally an exhaust pipe 10 extending from exhaust ports of the engine through an exhaust manifold, a NOx-occluded catalyst 11 installed in a portion of the exhaust pipe 10, an upstream oxygen sensor 12 installed in the exhaust pipe 10 upstream of the catalyst 11, and a downstream oxygen sensor 13 installed in the exhaust pipe 10 downstream of the catalyst 11. Outputs of these two oxygen sensors 12 and 13 are fed to the control unit 9.

As has been mentioned hereinabove, the NOx-occluded catalyst 11 has such a performance that when the exhaust gas from the engine 1 shows a leaner air/fuel ratio, the catalyst occludes NOx in the exhaust gas, while, when the exhaust gas shows a stoichiometric and/or richer air/fuel ratio, the catalyst releases NOx therefrom permitting reduction (or deoxidation) of NOx with the aid of HC and CO in the exhaust gas.

Between the catalyst 11 and the downstream oxygen sensor 13 in the exhaust pipe 10, there is installed a NOx-concentration sensor 14 that senses the concentration of NOx of the exhaust gas just emitted from the catalyst 11.

In the control unit 9, a NOx discharge from the engine 1 under a lean combustion operation is calculated based on both the air flow rate measured by the air flow meter 3 and the engine speed measured by the crank-angle sensor 8. When the NOx discharge thus calculated judges that the catalyst 11 has been saturated with NOx, addition of the fuel increase value to the basic fuel injection rate is carried out for a predetermined period. With this, for the period, the air/fuel ratio of the mixture led to the engine switches to rich side and thus the catalyst 11 is forced to release NOx therefrom for the period. Due to this momentarily enriching action, the NOx occluding power of the catalyst 11 becomes revived.

In the following, the process for carrying out the catalyst deterioration diagnosis of a first embodiment of the present invention will be described with reference to the flowcharts of FIGS. 2 to 4, which is executed in the control unit 9.

Figure 2:
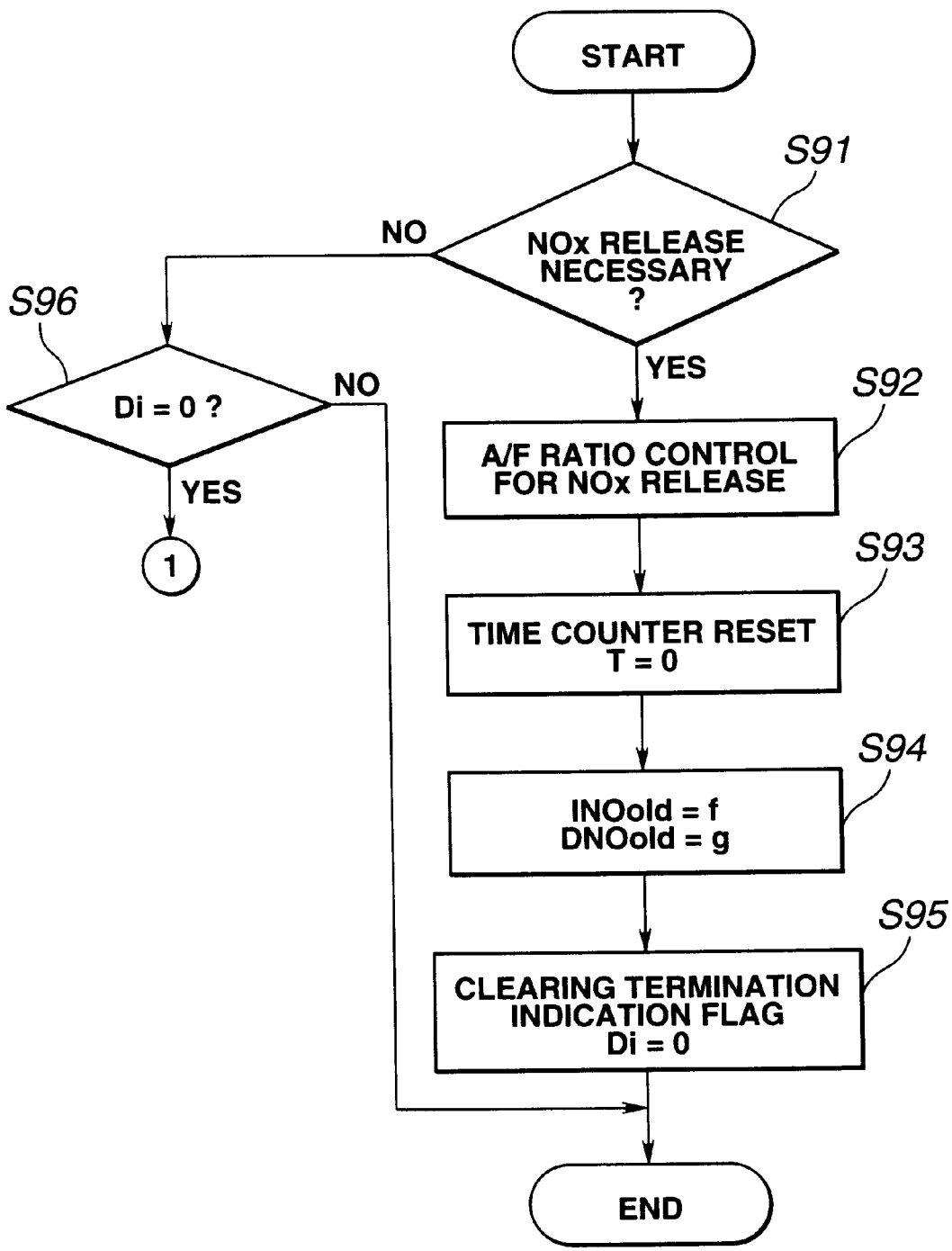
FIG. 2 is a flowchart showing a first section of programmed operation steps executed in a control unit employed in a first embodiment of the present invention.

The flowchart of FIG. 2 shows operation steps which are carried out every given times under operation of the engine 1.

At step S91, judgment is carried out as to whether or not the NOx-occluded catalyst 11 has come into a condition wherein NOx should be released from the catalyst 11. This judgement is practically effected by comparing the time (viz., NOx occluding time) for which the catalyst It has continued to occlude NOx with a reference time. If YES at step S91, that is, when it is judged that NOx should be released from the catalyst 11, the operation flow goes to step S92. If NO at step S91, the operation flow goes to step S96.

At step S92, the above-mentioned air/fuel ratio control for releasing NOx from the catalyst 11 is carried out, and then the operation flow goes to step S93. At this step S93, a time counter for counting the NOx occluding time "T" is reset, that is, "T=0" is established. Then, at step S94, the term "INOold" is made to a predetermined value "f", that is, "INOold=f" is established and the term "DNOold" is made to a predetermined value "g", that is, "DNOold=g" is established. Then, at step S95, a so-called deterioration diagnosis termination indication flag "Di" for indicating the termination of the deterioration diagnosis is cleared to terminate the operation flow. It is to be noted that "Di=0" means that the deterioration diagnosis processing is still unfinished.

While, at step S96, judgment is carried out as to whether the deterioration diagnosis termination indication flag "Di" is 0 (viz., zero) or not, that is, whether the deterioration diagnosis processing is still kept or not. If YES (viz., Di=0), that is, when it is judged that the deterioration diagnosis processing is still unfinished, the operation flow goes to step S101 of the flowchart of FIG. 3. While if NO (viz., Di=1) at step S96, the operation flow goes to END.

Figure 3:
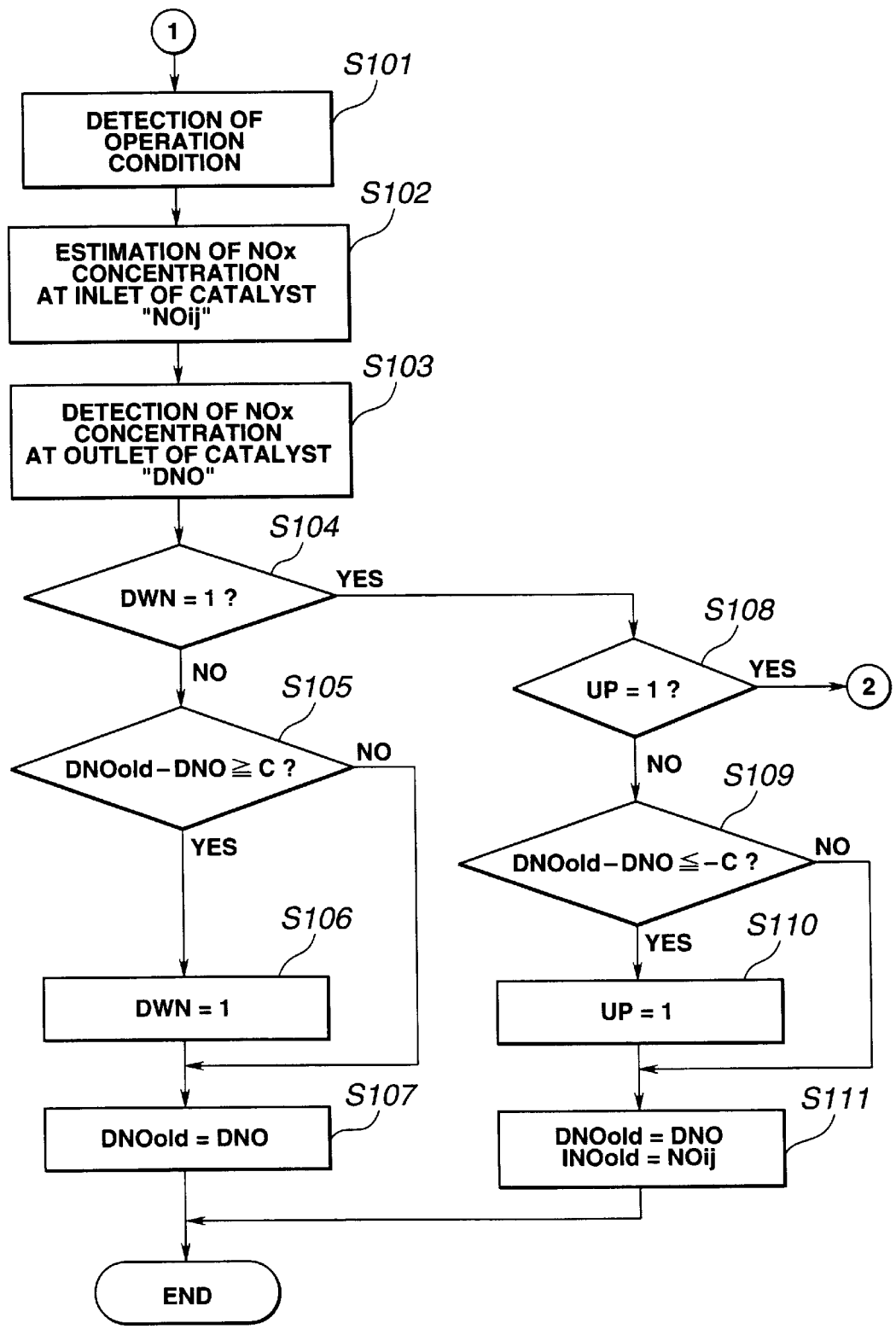
FIG. 3 is a flowchart showing a second section of the programmed operation steps executed by the first embodiment.
Figure 7:
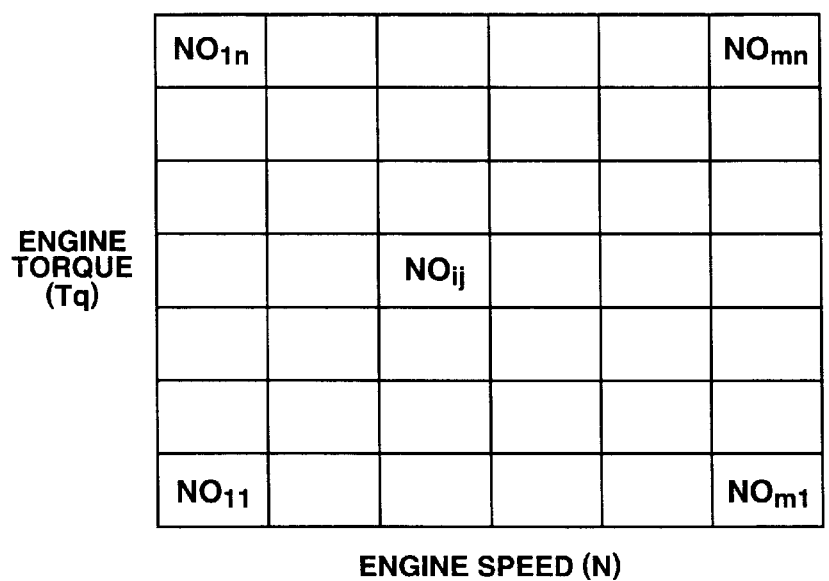
FIG. 7 is a map for estimating the concentration of NOx at a position upstream of the NOx-occluded catalyst.

In the flowchart of FIG. 3, at step S101, operation condition of the engine is detected, and at step S102, the concentration (viz., "NOij") of NOx at the inlet part of the NOx-occiuded catalyst 11 is estimated. The estimated value of the NOx concentration is looked up from the map of FIG. 7 which has been prepared based on the engine speed "N" and the engine torque "Tq". At step S103, the concentration (viz., "DNO") of NOx at the outlet part of the NOx-occluded catalyst 11 is detected. At step S104, judgment is carried out as to whether a so-called down gradient indication flag "DWN" is 1 (viz., one) or not. If YES, that is, when the flag "DWN" is 1, the operation flow goes to step S108, while, if NO, that is, when the flag "DWN" is 0 (viz., zero), the operation flow goes to step S105.

At step S105, judgment is carried out as to whether or not the NOx concentration at the outlet of the NOx-occluded catalyst 11 gradually reduces, that is, whether the inequality "DNOold−DNO≧C" is established or not. If YES, that is, when the inequality is established, the operation flow goes to step S106 to set the flag "DWN" to 1 (viz., one), while if NO, that is, when "DNOold−DNO<C" is established, the operation flow goes to step S107.

At step S107, the equality "DNOold=DNO" is provided.

While, at step S108, a so-called up gradient indication flag "UP" is 1 (viz., one) or not. If YES, that is, when the flag "UP" is 1, the operation flow goes to step S121 of the flowchart of FIG. 4, while, if NO, that is, when the flag "UP" is 0 (viz., zero), the operation flow goes to step S109.

At step S109, judgment is carried out as to whether or not the NOx concentration at the outlet of the NOx-occluded catalyst 11 gradually increases, that is, whether the inequality "DNOold−DNO≦−C" is established or not. If YES, that is, when the inequality "DNOold−DNO≦−C" is established, the operation flow goes to step S110 to set the flag "UP" to 1 (viz., one), while if NO, that is, when "DNOold−DNO>− C" is established, the operation flow goes to step S111.

At step S111, the equalities "DNOold=DNO" and "INOold=Noij" are prepared, and the operation flow goes to END.

Thus, when, at step S108, the equality "UP=1" is judged, the NOx concentration appearing at the outlet part of the catalyst 11 just before the time when the NOx concentration is forced to change from a reduction tendency to an increase tendency is memorized as the "DNOold", and the NOx concentration appearing at the inlet part of the catalyst 11 just before said the time is memorized as the "INOold".

Figure 4:
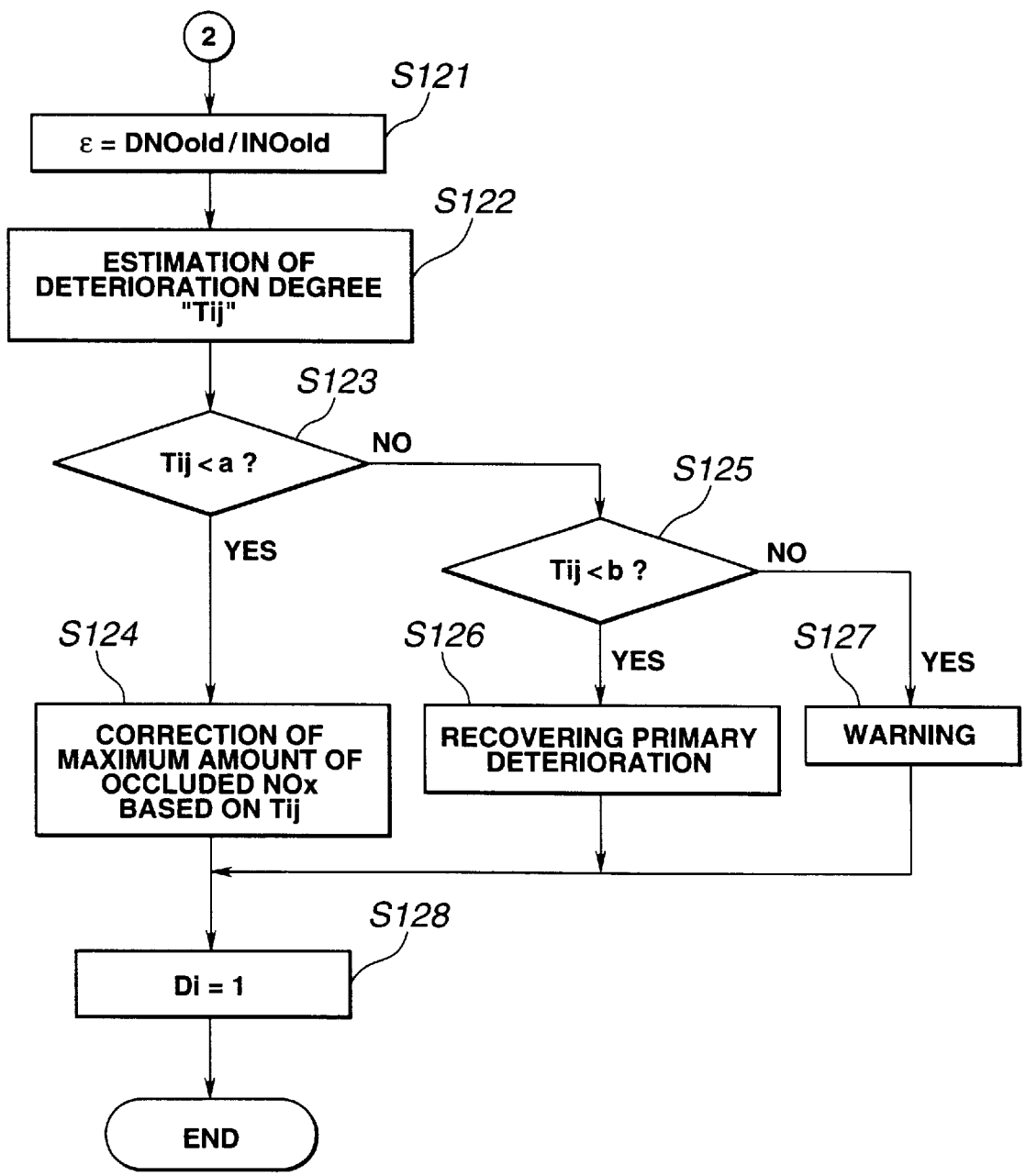
FIG. 4 is a flowchart showing a third section of the programmed operation steps executed by the first embodiment.

In the flowchart of FIG. 4, at step S121, the rate "ε" of the NOx concentration "DNOold" at the outlet part of the catalyst 11 to that "INOold" at the inlet part of the catalyst 11 is calculated. That is, "ε=DNOold/INOold" is calculated.

At step S122, a catalyst deterioration degree "Tij" is estimated. For this estimation, the degree "Tij" is looked up from the map of FIG. 8 which has been prepared based on the rate "ε" and the value INO (INO=INOold) of the NOx concentration at the inlet part of the catalyst 11.

At step S123, judgment is carried out as to whether the catalyst deterioration degree "Tij" is smaller than a predetermined value "a" or not, that is, whether "Tij<a" is established or not. If YES, that is, when the degree "Tij" is smaller than the vale "a", the operation flow goes to step S124, while, if NO, that is, when "Tij≧a" is established, the operation flow goes to step S125.

At step S124, the maximum amount of NOx occluded by the catalyst 11 corrected based on the catalyst deterioration degree "Tij". That is, with reference to the catalyst deterioration degree "Tij", the maximum NOx occluding amount of the catalyst 11 is corrected for adjusting the spike timing of a so-called rich spike control. As has been mentioned hereinabove, the rich spike control is a feedback control wherein when the amount of NOx occluded by the catalyst 11 is detected to come up to the maximum NOx occluding amount, the target air/fuel ratio of a mixture fed to the engine is temporarily changed to a richer side to force the catalyst 11 to release NOx for reduction (or deoxidation) of the same. Due to this feedback control, emission from the engine is improved.

At step S128, the deterioration diagnosis termination indication flag "Di" is set to 1 (viz., one), that is, "Di=1" is set and the operation flow goes to END.

While, at step S125, judgment is carried out as to whether the catalyst deterioration degree "Tij" is smaller than a predetermined value "b" or not, that is, whether "Tij<b" is established or not. If YES, that is, when the degree "Tij" is smaller than "b", the operation flow goes to step S126 to carry out a primary deterioration recovering process for the catalyst 11. The primary deterioration of the catalyst 11 is generally caused by poisoning by sulfur contained in fuel. Thus, in this case, a so-called lean mixture combustion (viz., stratified charge combustion) is suppressed for increasing the temperature of exhaust gas from the engine. With this, the catalyst 11 is heated up to such a degree as to promote the deterioration recovering.

If NO at step S125, that is, when the equation "Tij≧b" is determined, the operation flow goes to step S127. At this step, a warning is given for letting a viewer know that the deterioration degree of the catalyst 11 is great.

Figures 8, 9:
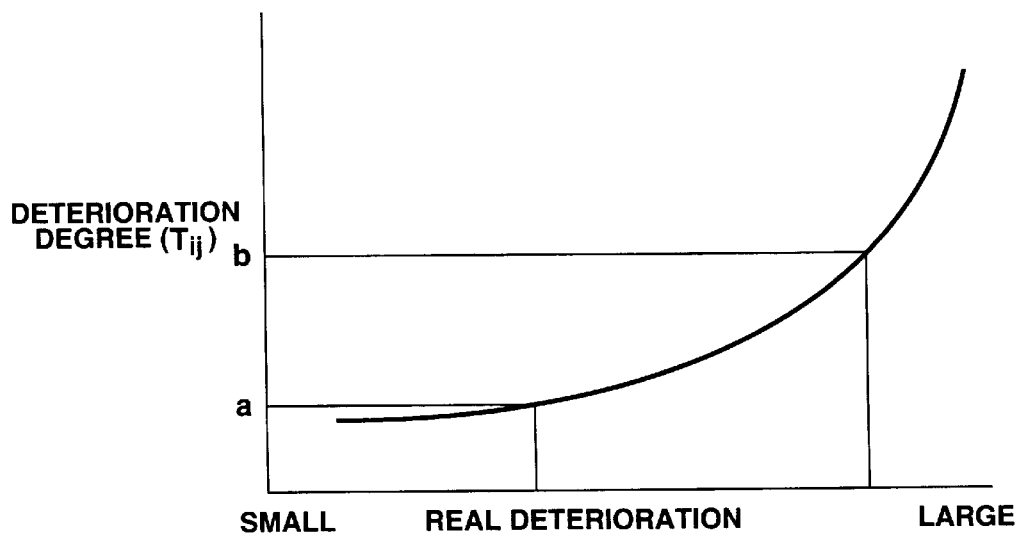
FIG. 8 is a map for estimating a deterioration degree of the NOx-occluded catalyst.
FIG. 9 is a graph showing the deterioration tendency of the NOx-occluded catalyst.

FIG. 9 is a graph showing the relationship between a real deterioration of the catalyst 11 and the estimated catalyst deterioration degree "Tij". As is seen from this graph, the predetermined value "a" of the degree "Tij" indicates less deterioration than the predetermined value "b".

In the following, the process for carrying out the catalyst deterioration diagnosis of a second embodiment of the present invention will be described with reference to the flowchart of FIG. 5, which is also executed in the control unit 9.

Figure 5:
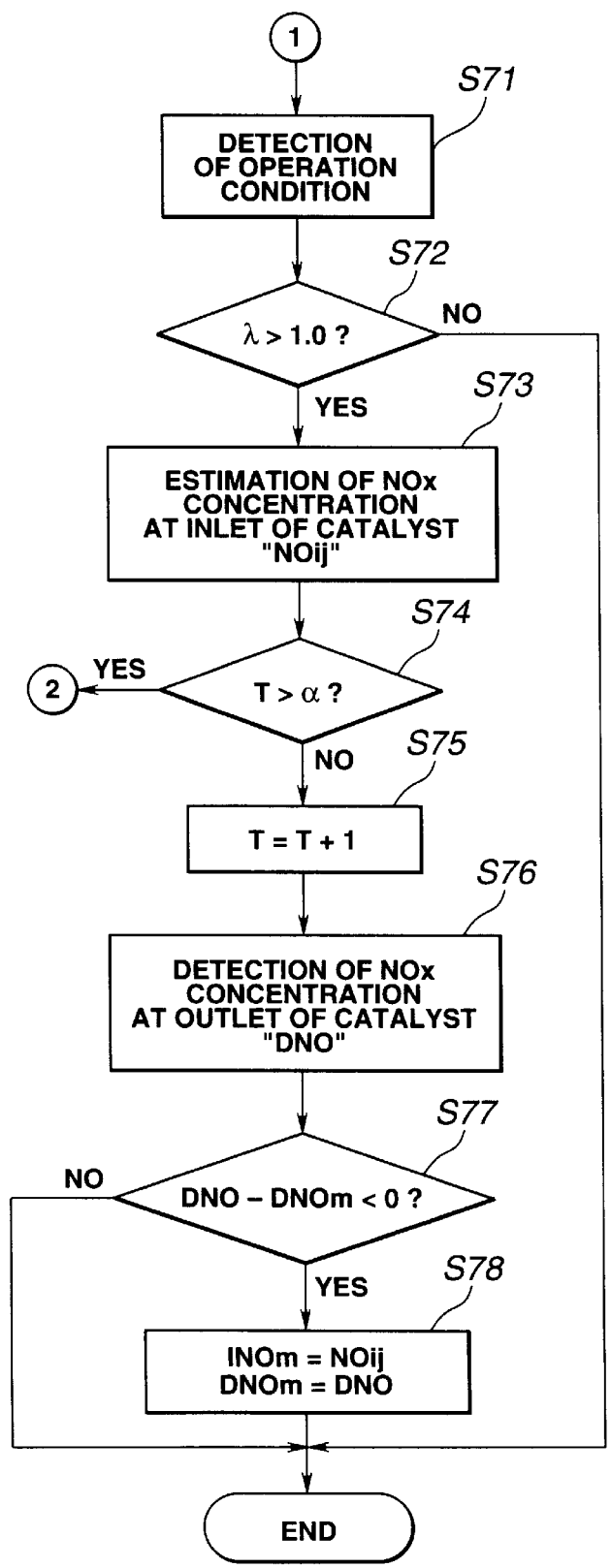
FIG. 5 is a flowchart showing. an essential section of programmed operation steps executed in a control unit employed in a second embodiment of the present invention.

Before the process of the flowchart of FIG. 5, the operation steps of FIG. 2 are carried out. That is, if, at step S96, the deterioration diagnosis termination indication flag "Di" is judged 0 (viz., zero), the operation flow goes to step S71 of the flowchart of FIG. 5.

In the flowchart of FIG. 5, at step S71, operation condition of the engine is detected, and at step S102, judgment is carried out as to whether the air/fuel ratio of the mixture fed to the engine is higher (or leaner) than the stoichiometric ratio (viz., 14.6) or not, that is, whether the value "λ" is greater than 1.0 or not. If YES, that is, when the mixture is lean with respect to the stoichiometric ratio (viz., "λ>1.0"), the operation flow goes to step S73, while, if NO, that is, when the mixture is not lean (viz., "λ≦1.0"), the operation flow goes to END.

At step S73, the concentration (viz., "Noij") of NOx at the inlet part of the NOx-occluded catalyst 11 is estimated. The estimated value of the NOx concentration is looked up from the map of FIG. 7, as has been mentioned hereinabove. At step S74, judgment is carried out as to whether a so-called NOx occluding time "T" for which NOx is being occluded by the catalyst 11 is greater than a predetermined time "α" or not, that is, whether "T>α" is established or not. In fact, the NOx occluding time "T" is a value counted by a timer. It is to be noted that the NOx occluding time "T" is equivalent to the time for which the engine operates on the leaner mixture. Actually, the time when the NOx concentration at the outlet of the catalyst shows the minimum value varies depending on the deterioration degree of the catalyst and the operation condition of the engine. However, broadly speaking, such time tends to appear just after the rich combustion operation and thus the minimum value of NOx concentration data detected within the predetermined time "α" can be considered as the minimum value which would appear within a period from a rich combustion operation to a subsequent rich combustion operation.

If YES at step S74, that is, when the NOx occluding time "T" is greater than the predetermined value "α", the operation flow goes to step S121 of the flowchart of FIG. 4. At this step S121, the rate "α" of the NOx concentration "DNOm" at the outlet part of the catalyst 11 to that "INOm" at the inlet part of the catalyst 11 is calculated.

If NO at step S74, that is, when "T≦α" is established, the operation flow goes to step S75 to add 1 (viz., one) to the counted time "T", that is, the equation "T=T+1" is executed. Then, at step S76, the concentration (viz., "DNO") of NOx at the outlet part of the catalyst 11 is detected. Then, at step S77, judgment is carried out as to whether the difference between the detected NOx concentration "DNO" and the minimum value "DNOm" of the NOx concentration "DNO" is smaller than 0 (viz., zero) or not, that is, the inequality "DNO−DNOm<0" is established or not. If YES, that is, when the difference "DNO−DNOm" is smaller than 0 (viz., zero), the operation flow goes to step S78. At this step S78, the NOx concentration "INOm" at the inlet part of the catalyst 11 and the minimum NOx concentration "DNOm" at the outlet part of the catalyst 11 are updated, that is, "INOm=NOij" and "DNOm=DNO" are executed. Then, the operation flow goes to END.

If NO at step S77, that is, when "DNO−DNOm≧0" is established, the operation flow toes to END.

Thus, when, at step S74, the judgment is so made that the NOx occluding time "T" has exceeded the predetermined value "α", the minimum one of a plurality of NOx concentration data provided at the outlet part of the catalyst during the time "T" is memorized as "DNOm" and the NOx concentration at the inlet part of the catalyst 11 at the time when the NOx concentration at the outlet part shows the minimum value is memorized as "INOm".

The entire contents of Japanese Patent Application P10-187145 (filed Jul. 2, 1998) are incorporated herein by reference.

Although the invention has been described above with reference to certain embodiments of the invention, the invention is not limited to the embodiments described above. Various modifications and variations of the embodiments described above will occur to those skilled in the art, in light of the above teachings.

What is claimed is:

1. A system for diagnosing deterioration of a NOx-occluded catalyst installed in an exhaust stream of an internal combustion engine, said catalyst occluding NOx in the exhaust gas when the engine exhaust gas led to the catalyst shows a leaner air/fuel ratio and releasing NOx therefrom when said engine exhaust gas shows a stoichiometric and/or richer air/fuel ratio, said system comprising:

an inlet NOx concentration estimating unit which estimates NOx concentration at an inlet part of said catalyst;

an outlet NOx concentration detecting unit which detects NOx concentration at an outlet part of said catalyst; and a deterioration degree judging unit which judges a deterioration degree of the catalyst in accordance with a rate of the minimum value of NOx concentration detected by said detecting unit for a predetermined period to a value of NOx concentration estimated by said estimating unit at the time when said minimum value of NOx concentration is detected, said predetermined period being a period between a time when the engine exhaust gas shows the stoichiometric and/or richer air/fuel ratio and a subsequent time when the engine exhaust gas shows the stoichiometric and/or richer air/fuel ratio.

2. A system as claimed in claim 1, in which said deterioration degree judging unit judges the deterioration degree of the catalyst in accordance with a rate of the minimum value of NOx concentration detected by said detecting unit during the time when the engine exhaust gas shows the leaner air/fuel ratio to a value of NOx concentration estimated by said estimating unit at the time when said minimum value is detected.

3. A system as claimed in claim 1, in which said deterioration degree judging unit judges the deterioration degree of the catalyst in accordance with a rate of the minimum value of NOx concentration detected by said detecting unit at a predetermined time to a value of NOx concentration estimated by said estimating unit at the time when said minimum value is detected, said predetermined time being a time when, after the engine is operated to produce an exhaust gas which shows the stoichiometric and/or richer air/fuel ratio, the NOx concentration detected by said detecting unit shows an up-gradient tendency just after showing a down-gradient tendency.

4. A system as claimed in claim 1, in which said deterioration degree judging unit judges the deterioration degree of the catalyst in accordance with a rate of the minimum one of NOx concentration data detected by said detecting unit until the time when the engine exhaust gas shows the stoichiometric and/or richer air/fuel ratio to a value of NOx concentration estimated by said estimating unit at the time when said minimum value is detected.

5. Method of diagnosing deterioration of a NOx-occluded catalyst installed in an exhaust stream of an internal combustion engine, said catalyst occluding NOx in the exhaust gas when the engine exhaust gas led to the catalyst shows a leaner air/fuel ratio and releasing NOx therefrom when said engine exhaust gas shows a stoichiometric and/or richer air/fuel ratio, said step comprising:

estimating NOx concentration at an inlet part of the catalyst;

detecting NOx concentration at an outlet part of the catalyst;

deriving a rate of the minimum value of the NOx concentration detected for a predetermined period to a value of NOx concentration estimated at the time when said minimum value is detected, said predetermined period being a period between a time when the engine exhaust gas shows the stoichiometric and/or richer air/fuel ratio and a subsequent time when the engine exhaust gas shows the stoichiometric and/or richer air/fuel ratio; and judging a deterioration degree of the catalyst in accordance with the derived rate.

6. Method as claimed in claim 5, in which said predetermined period is a period during which the engine exhaust gas shows the leaner air/fuel ratio.

7. Method as claimed in claim 5, in which said minimum value of the NOx concentration is detected at a time when, after the engine is operated to produce an exhaust gas which shows the stoichiometric and/or richer air/fuel ratio, the detected NOx concentration shows an up-gradient tendency just after showing a down-gradient tendency.

8. Method as claimed in claim 5, in which said minimum value of NOx concentration is derived from NOx concentration data detected until the time the engine exhaust gas shows the stoichiometric and/or richer air/fuel ratio.

9. A system for diagnosing deterioration of a NOx-occluded catalyst installed in an exhaust stream of an internal combustion engine, said catalyst occluding NOx in the exhaust gas when the engine exhaust gas led to the catalyst shows a leaner air/fuel ratio and releasing NOx therefrom when said engine exhaust gas shows a stoichiometric and/or richer air/fuel ratio, said system comprising:

first means for estimating NOx concentration at an inlet part of said catalyst;

second means for detecting NOx concentration at an outlet part of said catalyst; and third means for judging a deterioration degree of the catalyst in accordance with a rate of the minimum value of NOx concentration detected by said second means for a predetermined period to a value of NOx concentration estimated by said first means at the time when said minimum value of NOx concentration is detected, said predetermined period being a period between a time when the engine exhaust gas shows the stoichiometric and/or richer air/fuel ratio and a subsequent time when the engine exhaust gas shows the stoichiometric and/or richer air/fuel ratio.

* * * * *